C. L. BERGER.
SPIRIT LEVEL.
APPLICATION FILED MAR. 4, 1912.
1,148,349.
Patented July 27, 1915.
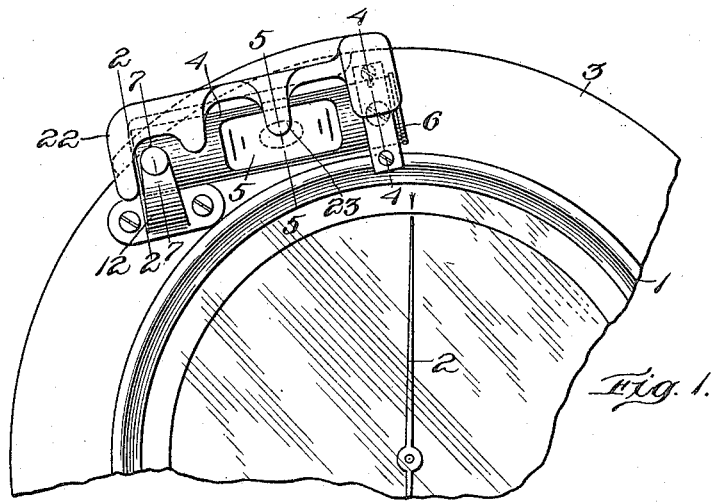
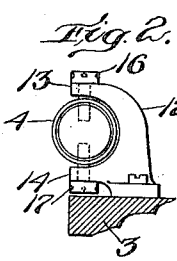 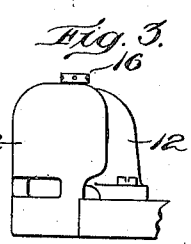 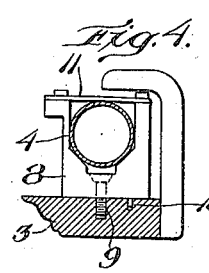 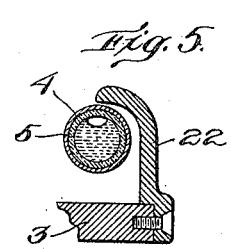
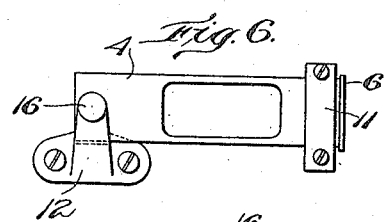
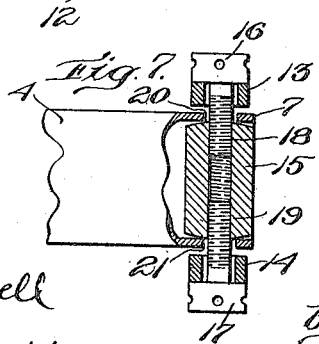
Witnesses:
Edward Maxwell
James R. Hodder
Inventor:
Christian L. Berger,
by Geo. H. Maxwell
Atty.

UNITED STATES PATENT OFFICE.

CHRISTIAN L. BERGER, OF BOSTON, MASSACHUSETTS.

SPIRIT-LEVEL.

1,148,349.  Specification of Letters Patent.  Patented July 27, 1915.

Application filed March 4, 1912. Serial No. 681,546.

*To all whom it may concern:*

Be it known that I, CHRISTIAN L. BERGER, a citizen of the United States, and resident of Boston, in the county of Suffolk and State of Massachusetts, have invented an Improvement in Spirit-Levels, of which the following description, in connection with the accompanying drawings, is a specification, like letters on the drawings representing like parts.

This invention relates to spirit levels and more particularly to such levels used in surveyors' instruments and known as plate levels.

In surveyors' transits and like instruments, it is desirable to mount a small spirit level directly upon the vernier plate of the instrument, in order to aid in "leveling up", but heretofore the means employed in mounting such a level has been unsatisfactory, and it is an especial object of this invention to improve and perfect the mounting and adjusting means for such plate levels.

It is also an object of the invention to provide means which will suitably hold and readily adjust a spirit level without any danger of straining or binding any part of either the tube, the vial, or the adjusting mechanism itself, and to have capacity for a considerable range in adjustments without any liability of binding.

Further objects of the invention are to provide simple and efficient means to hold and adjust a plate level within the limits of space allowed by the circumference of the vernier plate of a transit or of a compass to which such plate level may be attached, and to provide an improved construction, simple in operation, accurate in movements, and which will stay fixed in the position adjusted without danger of working loose. It is also difficult to mount a plate level because of the well known fact that the vial of the spirit level must be of a standard length with relation to its diameter, or the action of the bubble will be too sluggish for satisfactory use, and furthermore, the entire length of such a level and its supporting and adjusting means must be kept substantially within the limit of the circumference of the plate on which it is mounted so as to be protected from injury and damage. Therefore it is an important feature of my invention to provide the level-supporting and adjusting means in a compact form, and preferably to arrange a suitable guard which will approximately conform to the circumference of the plate and aid in protecting the level, besides serving as a means to indicate when the level is in accurate position. While the invention is not limited to use solely upon a plate level, it is nevertheless peculiarly applicable to such a level, and is therefore preferably shown as embodied in a level of that type.

Referring to the drawings, Figure 1 illustrates a portion of an ordinary surveyor's compass such as is usually employed in a transit or like instrument, and shown in plan view on the vernier plate thereof is a plate level embodying the preferred form of the invention; Fig. 2 is an end view on the line 2—2 of Fig. 1; Fig. 3 is an end view of the guard; Fig. 4 is a cross section on the line 4—4 of Fig. 1, showing the guard, level and a portion only of the compass plate; Fig. 5 is a cross-sectional view on the line 5—5 of Fig. 1; Fig. 6 is a plan view of the level and its holding devices with the guard omitted; and Fig. 7 is an enlarged cross-sectional view on the line 7—7 of Fig. 1, through the level holding and adjusting devices, with a portion of the tube shown in elevation.

In the drawings, 2 is the compass needle and 3 is the vernier plate of a surveyor's compass 1 such as is usually employed in transits and like instruments, and mounted on the plate 3 is a spirit level, comprising the tube 4 inclosing the vial 5, the tube having one end closed by a cap 6, and its other open end extended beyond the vial as indicated at 7. A Y member 8, secured to the plate 3 by a set screw 9 and pin 10, is arranged to support that end of the tube 4 to which the cap 6 is affixed. A bar 11 is secured by set screws to the top arms of the Y member 8, these arms being preferably of sufficient height so that the bar 11, when clamped home thereon, will engage the top of the tube 4 and "spring" slightly thereover so as to exert a tension upon the tube to seat it firmly in the lower bearing surfaces of the Y member, as clearly indicated in Fig. 4. Preferably these lower bearing surfaces are formed to afford provision for a slight rocking of the tube during adjustments of the level by raising or lowering the other end. To support the open end of the tube, a U-shaped member 12 is provided, being secured to the plate 3 by set screws, as indicated in Fig. 1, and having its arms 13, 14 of a length and of a width sufficient to partially inclose the tube as indicated in Fig. 2. In the open end 7 of the tube 4 is arranged a member 15 substantially equal in its diameter to the inner diameter of said tube and preferably so formed that it is capable of a slight rocking engagement within the open end of the tube while still substantially filling said end. This construction is shown in Fig. 7, and it will be readily noted that as the member 15 may be raised or lowered to raise or lower the level, there will necessarily be a slight rocking engagement between the member 15 and the open end of the tube until it is positioned. The arms 13 and 14 of the U-shaped member 12 are provided with apertures to receive— loosely—the threaded stems of capstan screws 16 and 17, and the member 15 is provided with a diametrically threaded bore 18 and 19 to receive the threaded stems of these capstan screws, which stems pass through appropriate orifices 20 and 21 in the tube 4. These orifices 20 and 21 and also those in the arms 13 and 14 are of sufficiently greater diameter than the stems of the screws 16 and 17 respectively so as to allow for considerable "play" as the screws are manipulated to raise or lower this end of the tube 4 and consequently cause a relative rocking movement between the tube and the member 15 as above mentioned. In adjusting the level here shown, it is only necessary to manipulate the capstan screws 16 and 17 to properly raise or lower one end of the level, and when adjusted to desired position and the screws 16 and 17 are each tightened, it will be seen that each tends to automatically lock the other in its adjusted position, and as no strain or binding action is possible, there is no tendency for the level to work out of its adjusted position. Consequently the plate level so adjusted will withstand the rough usage to which a surveyor's instrument is often subjected while in field use, as the adjustments made by the means just described will be permanent. This feature is of considerable importance in actual practice and is of substantial advantage, as the operations of adjusting and truing up the level are reduced to a minimum.

Preferably a guard member 22 is arranged, which may be secured to the edge of the circumference of the vernier plate 3 by suitable set screws, one of which is shown in Fig. 5, this guard also having a member 23 which may be conveniently arranged to project over the center of the "sight" of the level so as to aid in indicating when the bubble is centered and the level is in its accurate horizontal plane. This guard member 22 is so formed as not to interfere with the manipulation of the capstan screws 16 and 17, while still effectually acting as a guard for the entire level. This arrangement, whereby the level is sustained at one end in a Y member having provision for retaining it under tension upon convexed bearing surfaces, so that it may readily rock without strain, and having a means to sustain and to adjust the other end of the level without any possibility of binding or straining either the tube, the vial, or the adjusting mechanism, will be readily appreciated by those skilled in the art as especially advantageous when applied to a plate level as just described. As such a level must be comparatively short, the adjustments must be more carefully and accurately made than in a longer level, and when so made it is important that they be permanent. Such adjustments are dependent upon atmospheric conditions as well as upon the instrument and the compass plate on which the level is mounted.

Having described my invention, what I claim as new and desire to secure by Letters Patent is:

1. A spirit level, comprising a tube formed with an extended open end, a single supporting member substantially filling said open end, means to raise and lower the supporting member, and a clamping support for the other end of the tube, which clamping member is arranged so that the tube receives a relative rocking movement during the raising and lowering of the supporting member at the open end of said tube.

2. A spirit level, comprising a tube formed with an extended open end, a single supporting member substantially filling said open end, supports outside said tube and adjacent said member which member is provided with a threaded socket, means to raise and lower said supporting member, which means comprises diametrically opposed screws threaded in said socket and passing freely through said fixed supports outside of said tube.

In testimony whereof, I have signed my name to this specification, in the presence of two subscribing witnesses.

CHRISTIAN L. BERGER.

Witnesses:
 EDWARD MAXWELL,
 JAMES R. HODDER.

Copies of this patent may be obtained for five cents each, by addressing the "Commissioner of Patents, Washington, D. C."